United States Patent [19]
Keeney

[11] Patent Number: 5,640,228
[45] Date of Patent: *Jun. 17, 1997

[54] SCANNING EXPOSURE SLIT FOR AN IMAGE-RECORDING APPARATUS

[75] Inventor: Richard A. Keeney, Eagan, Minn.

[73] Assignee: Management Graphics, Inc., Minneapolis, Minn.

[ * ] Notice: The term of this patent shall not extend beyond the expiration date of Pat. No. 5,565,960.

[21] Appl. No.: 677,597

[22] Filed: Jul. 9, 1996

Related U.S. Application Data

[63] Continuation of Ser. No. 323,392, Oct. 14, 1994, Pat. No. 5,565,960.
[51] Int. Cl.$^6$ .............................. G03B 27/58; G03B 9/36; G03B 1/48
[52] U.S. Cl. .............................. 355/72; 355/20; 352/225; 396/483
[58] Field of Search .............................. 355/20, 53, 72, 355/233, 73; 354/76, 77, 245; 352/221, 225

[56] References Cited

U.S. PATENT DOCUMENTS

| | | | |
|---|---|---|---|
| 2,063,016 | 12/1936 | Ames | 352/225 |
| 2,944,476 | 7/1960 | Pollick et al. | 354/245 |
| 3,583,801 | 6/1971 | Roth | 352/172 |
| 3,903,539 | 9/1975 | Kitai et al. | 354/246 |
| 4,488,803 | 12/1984 | Nishihama et al. | 355/73 |
| 5,084,729 | 1/1992 | Yakubo et al. | 355/74 |
| 5,565,960 | 10/1996 | Keeney | 355/72 |

Primary Examiner—Arthur T. Grimley
Assistant Examiner—David A. Lane
Attorney, Agent, or Firm—Barry R. Lipsitz; Ralph F. Hoppin

[57] ABSTRACT

An exposure slit is provided for a shuttle style film gate in a film transport. The exposure slit is provided on a plate that is mounted to the film gate shuttle. After the shuttle advances a frame of the film, it carries the slit with it during its return to a home position. Exposure of the film frame is made through the slit during the return travel.

19 Claims, 4 Drawing Sheets

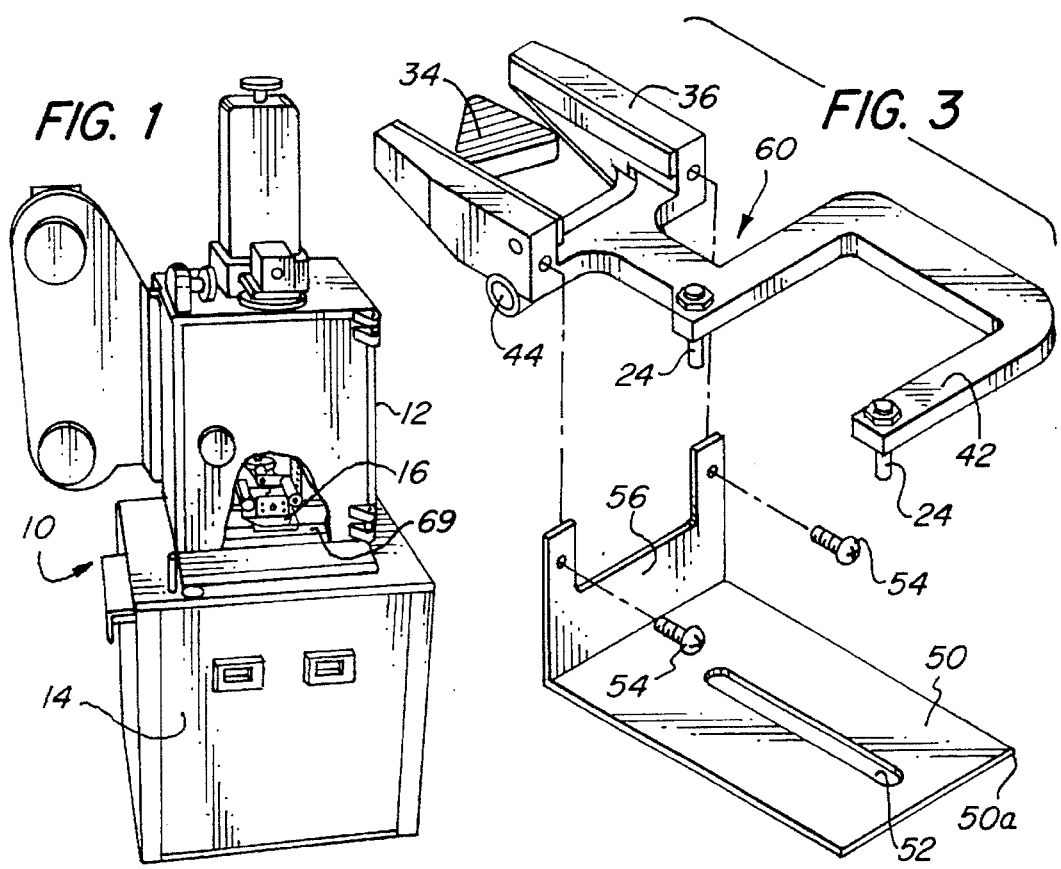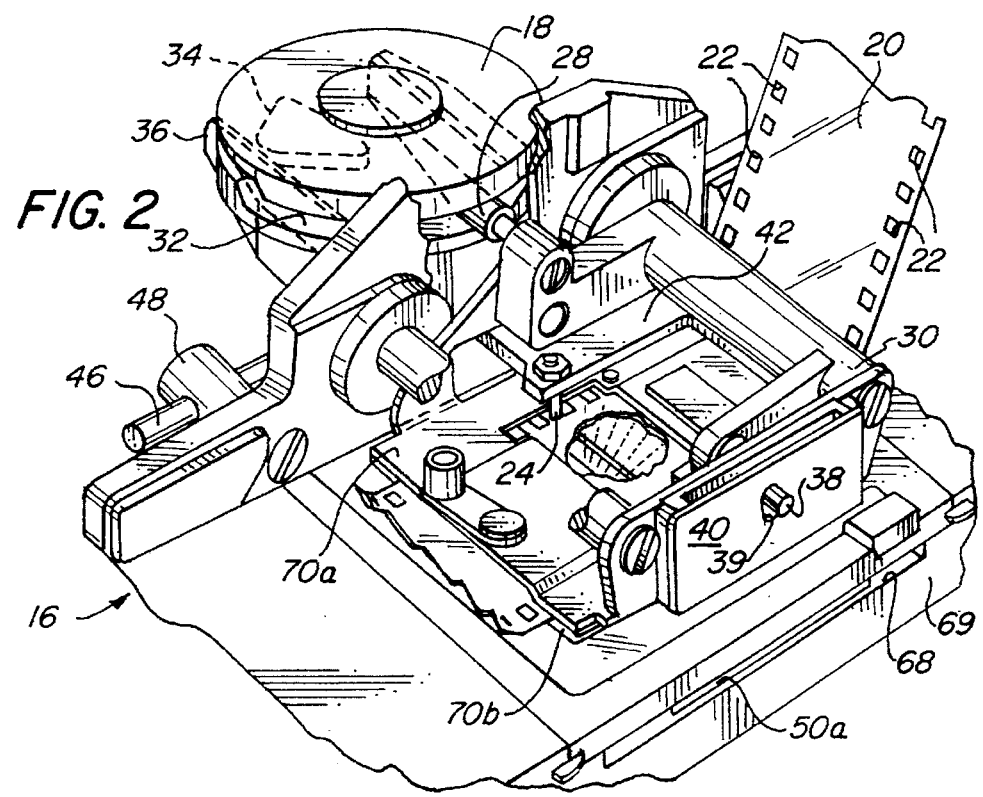

SCANNING EXPOSURE SLIT FOR AN IMAGE-RECORDING APPARATUS

This application is a continuation of commonly assigned, co-pending U.S. patent application Ser. No. 08/323,392, filed Oct. 14, 1994, now U.S. Pat. No. 5,565,960 issued Oct. 15, 1996.

BACKGROUND OF THE INVENTION

The present invention relates to apparatus for imaging photographic film or the like, and more particularly to a scanning exposure slit for a shuttle style film gate used in a film transport. As used herein, the term "film" is intended to mean any type of image recording medium, including photographic film, thermal media, dye transfer media and the like, and is not to be construed only as photographic film.

In order to record high quality images on photographic film or other media for the production of movies or slides, film recorders are used. In a conventional film recorder, a light beam from a cathode ray tube ("CRT") or the like is controlled by a deflection system to scan across a stationary frame of photographic film to expose the film with an image. Typically, the images are generated by a computer for the production of slides, transparencies, photographs or the like. Alternatively, the images can comprise natural images acquired by a scanner or television camera for subsequent processing by a computer.

Known film recorders, such as those sold under the trademark SOLITAIRE® by Management Graphics, Inc. of Minneapolis, Minn., U.S.A., typically include a light source such as a CRT for producing a beam, a deflection system for scanning the beam across the face of the CRT, a system control and central processor unit ("CPU") for controlling the deflection system, and a camera (i.e., "film transport"). The later component may include a film transport body, lens, lens mounting assembly, aperture plate, film plate, and film transport mechanism. One type of film transport mechanism that is widely in use is a shuttle style film gate. Such transports are manufactured, for example, by Oxberry Corporation of Mamaroneck, N.Y., U.S.A.

On a Solitaire® film recorder, an image to be recorded is first written on the phosphor of the CRT by deflecting an electron beam in a raster pattern and modulating the intensity of the beam. This process is analogous to the creation of a television picture. Alternatively, the image can be written on the CRT using well known time modulation techniques, wherein the beam intensity is constant but the time the beam is kept at each point is varied depending on the exposure required.

The resulting pattern (the "object image") on the CRT is optically imaged onto photographic film by the film transport, which contains the required optics and mechanism to advance the film to successive frames. Other types of light sources can be substituted for the CRT in a film recorder. Examples include fiber optic sources, lasers and focused light impinging a rotating drum wherein one or more rotations are completed for each scan line.

One problem that has arisen when light is scanned onto the film one line at a time is that the light for one line will bleed over into other lines. This results in fogging of the image or a halo effect that is detrimental to the final image.

In a shuttle style film gate, such as that used in the aforementioned Oxberry film transport, successive frames of film are moved into an exposure area one at a time. The film is transported through the exposure area using pins which engage sprockets on the film. The pins pick up the film at one end of the exposure area and transport it to the other end, where the new frame is then lowered (or raised) onto fixed pins which precisely register the frame for exposure. During exposure, the moving pins are returned to the first end of the exposure area where they will be ready to pick up the film after exposure of the current frame, in order to transport the next successive frame into position for exposure. The moving pins can be driven by a stepper motor, which can be controlled by an electronic controller (e.g., CPU) in order to properly synchronize the film transport and exposure operations.

It would be advantageous to provide such a shuttle style film gate with a mechanism for reducing the fog and halo effects which result when light from one line being scanned bleeds over into other lines. It would be further advantageous to provide such a mechanism that can be fitted onto a conventional shuttle style film gate with minimal modification. It would be still further advantageous to provide such a mechanism that takes advantage of the motion already provided by the film gate in order to overcome the problems of fog and halo.

The present invention provides a scanning exposure slit mechanism having the aforementioned and other advantages.

SUMMARY OF THE INVENTION

In accordance with the present invention, an image recording apparatus is presented for exposing a recording medium with radiation such as a scanning beam from an imaging source. The apparatus includes a plate which has an exposure slit arranged in proximity to the recording medium. The slit passes the radiation from the imaging source to the recording medium within the boundaries of the slit.

The apparatus further includes transport means for driving the plate along the recording medium to allow exposure of different regions of the recording medium via the slit. A control is also provided for coordinating the driving of the plate with movement of the radiation, for instance, to provide progressive exposure of the recording medium.

The exposure slit may be used, for example, to improve a shuttle style film gate of a film transport. The film gate has at least one first pin for releasably transporting film across an exposure aperture of the film gate and at least one second pin that is independent of the first pin for releasably holding a frame of the film in registration adjacent the aperture for exposure by an imaging source. The first pin extends from a shuttle member that is driven in a first direction from a starting point to advance the film through the film gate. The shuttle member is driveable in a second direction opposite to the first direction to return to the starting point while the film is held by the second pin. The improvement comprises a plate extending from the shuttle member for movement therewith. The plate has an exposure slit arranged therein to pass between the aperture and the imaging source when the shuttle is driven in the second direction. In this manner, the film frame can be exposed by a beam from the imaging source passing through the slit as the slit moves across the frame in the second direction.

In an illustrated embodiment, the shuttle comprises a fork that rides on a motor-driven cam for reciprocal motion along the first and second directions. The plate is mounted to the fork for extension away from the cam in a third direction perpendicular to the first and second directions. In this embodiment, the first pin is mounted to a transport arm that extends from the fork in the third direction. The plate and transport arm overlap in respective first and second planes that are parallel to one another with the exposure aperture between them. The exposure aperture defines an image plane that is parallel to the first and second planes. The slit extends longitudinally in the third direction.

The shuttle is driven by a motor, such as a stepper motor. Control means are coupled to the motor and the imaging source for synchronizing the movement of the exposure slit and the beam in the second direction as the film frame is being exposed. The imaging source can comprise, for example, a slow scan CRT film recorder.

BRIEF DESCRIPTION OF THE DRAWINGS

FIG. 1 is a perspective view of an image recorder having a film transport mounted thereon;

FIG. 2 is a perspective view of a shuttle style film gate which has been modified in accordance with the present invention;

FIG. 3 is an exploded perspective view of a shuttle and exposure slit assembly in accordance with the present invention;

DETAILED DESCRIPTION OF THE INVENTION

Figure 4:
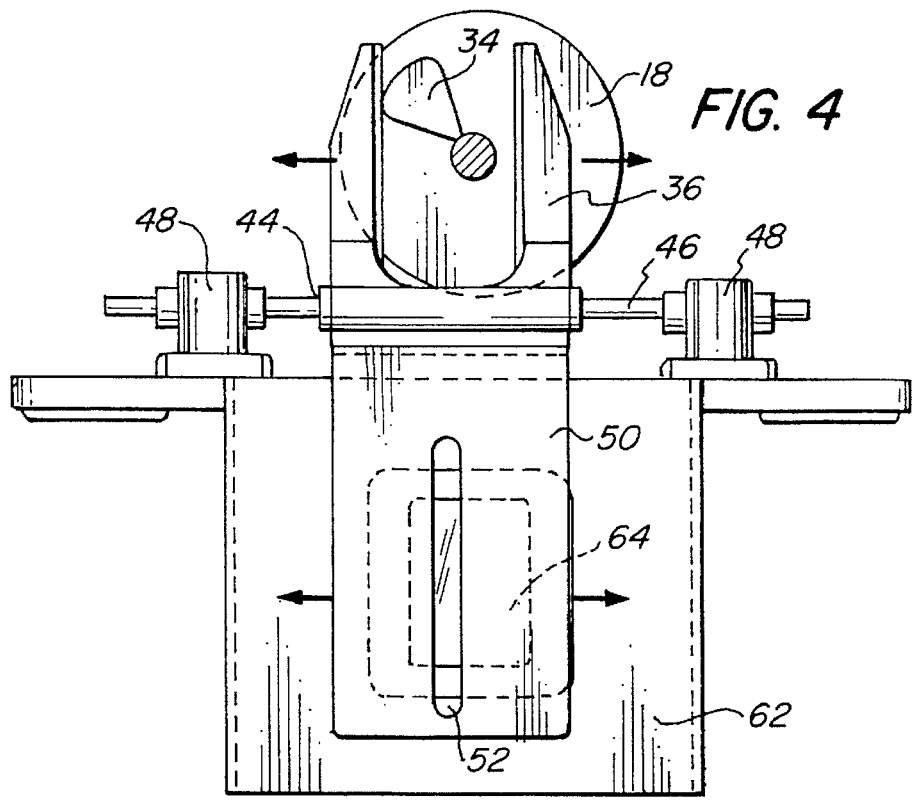
FIG. 4 is a simplified bottom plan view of the film gate assembly as modified in accordance with the present invention.

The present invention provides an exposure slit for a shuttle style film gate. Such film gates are found, for example, in film transports used in combination with computerized image recorders. Such a combination, generally designated 10 in FIG. 1, comprises an image recorder 14 and a film transport 12. The purpose of the film transport is to carry photographic film or a similar recording medium that is to be exposed (i.e., imaged) by the image recorder, and to properly place each successive frame of the recording medium into registration with the image recorder optics for exposure. The film transport 12 includes a shuttle style film gate 16 which is removably mounted to a mounting plate 69.

The film gate 16 is illustrated in greater detail in FIGS. 2–5. The purpose of the film gate is to transport recording medium 20 over an aperture 64 (best shown in FIGS. 4 and 5) one frame at a time. The film gate must precisely register each successive frame over the aperture so that proper exposure of the film can be made. Precise registration is accomplished through a plurality of fixed registration pins 26, shown in FIG. 5. The fixed registration pins engage sprocket holes 22 in the recording medium 20.

Within the film gate, the recording medium travels between top and bottom gate elements 70a, 70b, respectively. These gate elements are mounted for movement away from and towards the aperture 64 via a lifting mechanism 30 which, in turn, is raised and lowered by the action of a cam follower 28 riding on a cam surface 32 of cam 18. The raising and lowering of lifting mechanism 30 is guided at the outboard edge of the film gate by a guide pin 38 that rides in slot 39 of support plate 40.

When the film gate elements 70a, 70b are lifted away from the aperture 64, the sprocket holes 22 of the recording medium carried therebetween are lifted off of the fixed registration pins 26. As a result, the recording medium is free to slide in a lengthwise direction between elements 70a, 70b. In order to advance the recording medium for the exposure of the next frame, moving pins 24 are provided to engage the sprocket holes 22 when the recording medium is lifted off of the fixed pins 26.

The moving pins 24 extend from a shuttle member generally designated 60 (FIG. 3) which comprises a fork portion 36 and a transport arm 42. The transport pins 24 extend from transport arm 42 and move with the transport arm back and forth in the lengthwise direction of the recording medium when the fork 36 is driven by lobe 34 of cam 18. The shuttling motion of the transport arm 42 is restricted to the lengthwise direction of the recording medium by the provision of bearing 44 on fork 36 which rides on shaft 46 (FIGS. 2, 4) of the film gate assembly. The shaft 46 is mounted to the assembly via mounts 48.

The rotation of cam 18, and thereby lobe 34 will cause the shuttle member 60 to transport the recording medium 20 from the left side of the film gate toward the right side thereof, from the viewpoint of FIG. 2, via pins 24 which engage sprocket holes 22 of the recording medium. The positions of lobe 34 and cam surface 32 are arranged such that the lifting mechanism 30 will lift the film gate elements 70a, 70b upwardly so that corresponding sprocket holes 22 will engage transport pins 24 when the transport arm 42 is on the left side of the film gate. After the transport arm 42 has shuttled to the right, pulling the recording medium with it, lifting mechanism 30 will lower the film off of the transport pins 24 and on to the fixed pins 26. The transport arm 42 is then free to return to its leftmost position, together with the rest of the shuttle member 60 while the recording medium is being imaged. In other words, the transport arm 42 will move the recording medium from the left to the right when pins 24 engage corresponding sprocket holes 22, and will be free to return to the left without moving the recording medium when the recording medium has been lowered onto the fixed registration pins 26.

In accordance with the present invention, a plate 50 is mounted to the conventional shuttle member 60. Plate 50 includes an exposure slit 52 that will move with the transport arm 42. In the specific embodiment shown, plate 50 is mounted directly to the fork portion 36 of the shuttle member 60 via screws 54. The plate 50 is bent at a 90° angle to provide a mounting portion 56 for this purpose.

In order to accommodate the plate 50 in an otherwise conventional film transport, a portion of mounting plate 69 is machined to provide a channel 68 on which the outer lip 50a of the plate 50 rides. This is most clearly illustrated in FIG. 2. If desired, the surface 68 can be coated with a material such as teflon to facilitate the movement of the lip 50a thereacross.

Figure 6B:
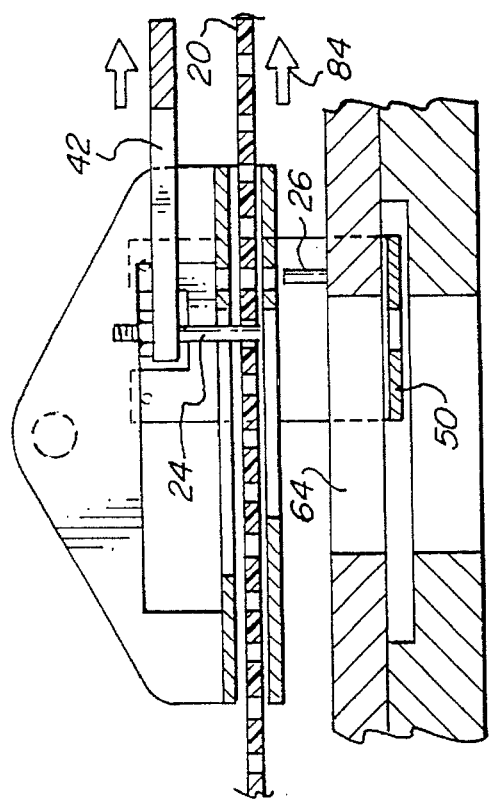
FIGS. 6A to 6D are diagrammatic illustrations showing the operation of the film gate in accordance with the present invention.
Figure 6D:
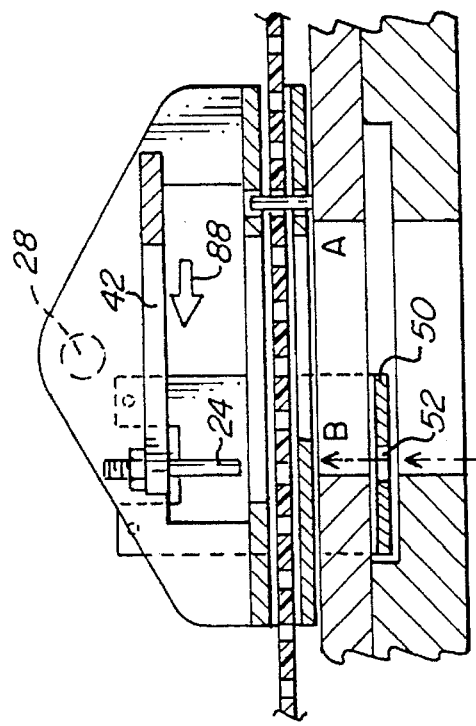
Figure 6A:
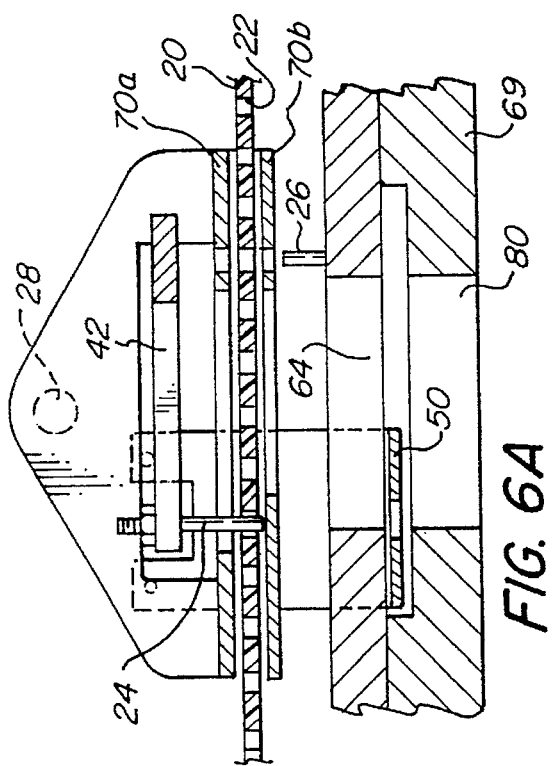

The transport of the recording medium across the film gate and the exposure thereof via slit 52 is illustrated schematically in FIGS. 6A to 6D. FIG. 6A illustrates the film gate elements 70a and 70b in an upper position, with the recording medium 20 therebetween. In the upper position, transport pins 24 extending from transport arm 42 engage corresponding sprocket holes 22 in the recording medium. The recording medium is not constrained by fixed pins 26. Thus, the transport arm 42 is free to pull the recording medium to the right, as illustrated by arrows 84 in FIG. 6B.

After the transport arm has pulled the recording medium to the right, the film gate elements 70a, 70b with the recording medium therebetween are lowered in the direction indicated by arrow 86 (FIG. 6C) so that corresponding sprocket holes in the recording medium will engage fixed pins 26. At this point, transport pins 24 will no longer engage any sprocket holes in the recording medium. The transport arm is therefore free to move (together with the rest of the shuttle member 60) in the direction of arrow 88 (FIG. 6D) where the transport pins 24 will be in a position to receive the recording medium for the next transport cycle.

When the recording medium is lowered against aperture 64 and held in a fixed position by fixed pins 26, the current frame thereof is ready to be exposed via a beam (e.g., a CRT beam) from the image recorder 14 (FIG. 1). In order to reduce undesirable effects such as flare, halo or fogging, the exposure slit 52 of the present invention limits the area of the recording medium exposed at any one time to a narrow slit.

Figure 6C:
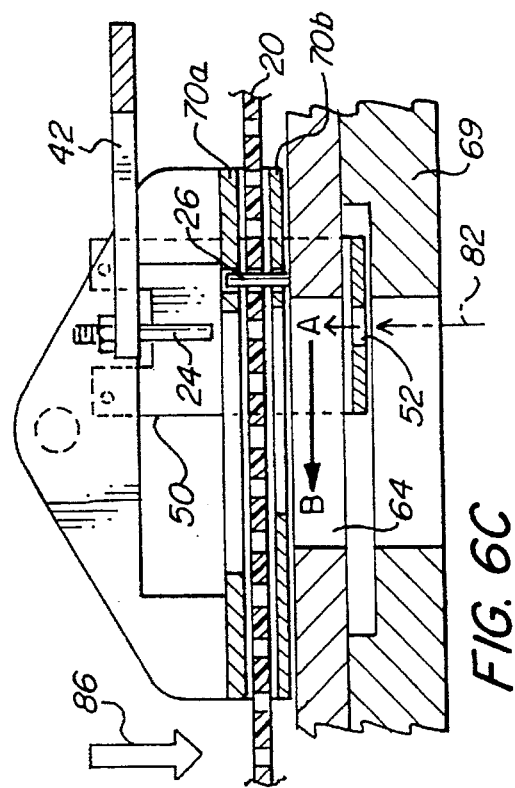

In order to expose the recording medium, the beam 82 is scanned from point A to point B shown in FIG. 6C. During the exposure of the recording medium, transport arm 42 is returning from its position adjacent point A shown in FIG. 6C to the position adjacent point B illustrated in FIG. 6D. Since the exposure slit provided in accordance with the present invention is carried on plate 50 which is mounted to the shuttle member 60, it will be carried from point A to point B together with the transport arm 42. Thus, exposure slit 52 tracks in the same direction and at the same time as exposure beam 82.

Figure 5:
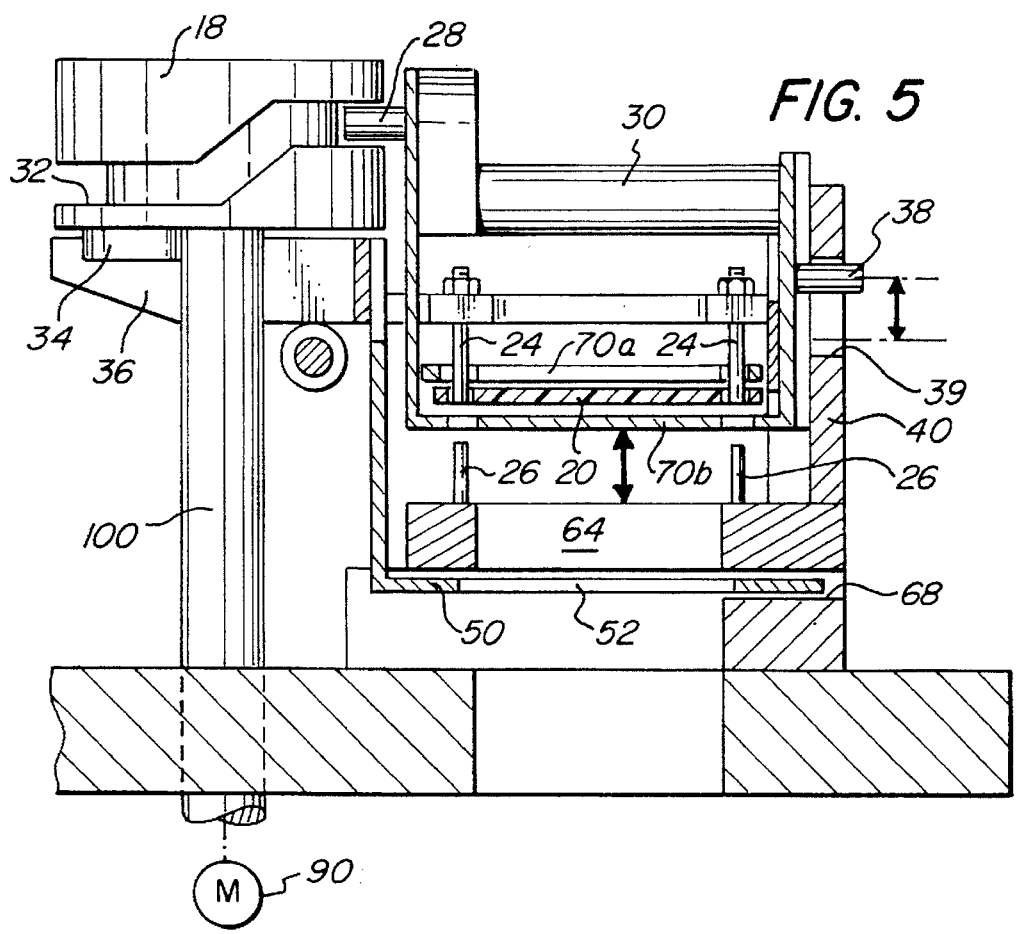
FIG. 5 is a cross-sectional view of the film gate assembly of FIG. 2.
Figure 7:
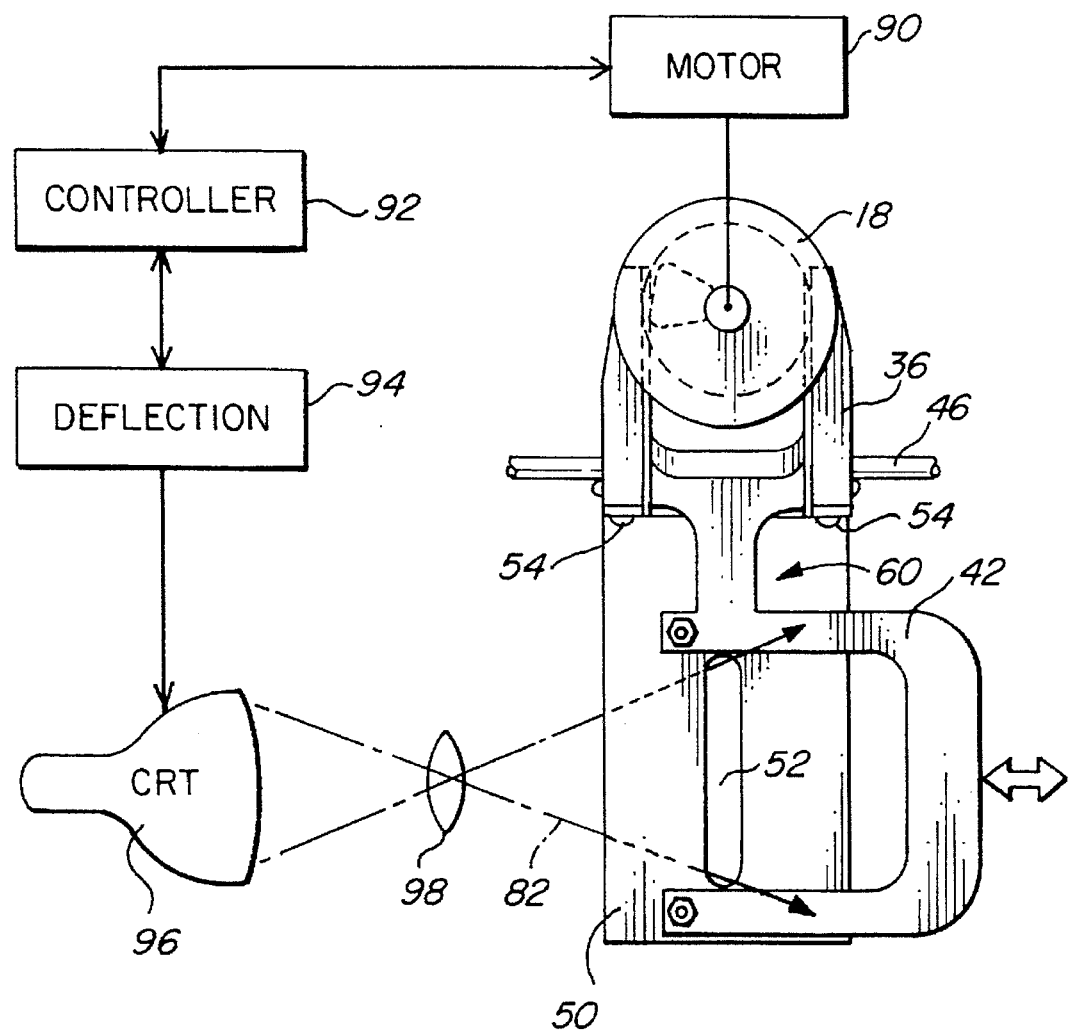
FIG. 7 is a schematic illustration of control means for the modified film gate in accordance with the present invention.

Proper synchronization of the exposure slit and the beam from the image recorder is easily accomplished by controlling the image recorder deflection system and the film transport stepper motor. Such a control system is illustrated schematically in FIG. 7. Motor 90 is the stepper motor which controls the film gate cam 18 via shaft 100 as shown in FIG. 5. As the motor turns, the shuttle member 60 will carry the plate 50 and slit 52 under the aperture 64. This is clearly seen in the bottom view of FIG. 4, which shows how plate 50 tracks across the bottom wall 62 of the aperture assembly during the rotation of cam 18.

A controller 92 (FIG. 7) synchronizes the rotation of stepper motor 90, and thereby cam 18, with the deflection of the image recorder CRT 96 via deflection circuitry 94. The controller function can be provided, e.g., by the CPU that is already present in the image recorder. The stepper motor is incremented at whatever rate is necessary to enable the exposure slit to track the exposure beam along the frame being exposed.

The beam 82, which is projected through optics 98, is scanned back and forth along the length of the slit to expose the recording medium. After the exposure has been completed, transport arm 42 will be in the proper position to enable pins 24 to receive the recording medium and advance it to the next frame for exposure. The same sequence of operation will continue for each successive frame, with the exposure slit 52 being carried by the return of the transport arm 42 in the proper direction to enable exposure of the recording medium therethrough.

It should now be appreciated that the present invention provides an advantageous improvement for a shuttle style film gate. An exposure slit is provided with only minor modification to the film gate, to improve exposure accuracy. The slit is carried by the normal movement of the shuttle member, while remaining synchronized with the image recorder beam path.

Although the invention has been described in connection with a preferred embodiment thereof, those skilled in the art will appreciate that numerous adaptations and modifications may be made thereto without departing from the spirit and scope of the invention as set forth in the claims.

What is claimed is:

1. An image recording apparatus for exposing a recording medium with radiation from an imaging source, comprising:

a plate having an elongated exposure slit arranged in proximity to said recording medium for passing said radiation to said recording medium within boundaries of said slit;

transport means for driving said plate along said recording medium to allow exposure of different regions of the recording medium via said slit; and control means for coordinating the driving of said plate with movement of said radiation;

wherein said radiation comprises a scanning beam which scans across at least a portion of a length of said slit to provide exposure of a corresponding region of said recording medium.

2. The apparatus of claim 1, wherein:

said control means coordinates the driving of said plate with movement of said scanning beam.

3. The apparatus of claim 1, wherein said movement of said scanning beam provides progressive exposure of at least a portion of said recording medium.

4. The apparatus of claim 1, wherein said transport means and said control means are adapted to provide progressive exposure of said recording medium by said scanning beam.

5. The apparatus of claim 1, wherein said exposure slit is arranged adjacent to said recording medium.

6. The apparatus of claim 1, wherein said transport means is adapted to transport said plate and said recording medium to allow exposure of a subsequent region of said recording medium.

7. The apparatus of claim 1, wherein said transport means drives said plate in a direction which is substantially perpendicular to a longitudinal axis of said exposure slit.

8. The apparatus of claim 1, wherein: said scanning beam is derived from at least one of a cathode-ray tube, a fiber optic source, and a laser.

9. An image recording apparatus for exposing successive frames of a recording medium with a scanning beam of an imaging source, comprising:

transport means adapted to transport said successive frames of said recording medium for exposure by said scanning beam;

a plate including an exposure slit for communicating said scanning beam to a frame of said recording medium, said exposure slit being arranged adjacent to said frame and substantially parallel with a scanning direction of said scanning beam; and control means for coordinating movement of said plate with respect to said scanning beam;

wherein said scanning beam scans across at least a portion of said slit to provide exposure of a corresponding region of said recording medium.

10. The apparatus of claim 9, wherein said movement provides progressive exposure of at least a portion of said frame.

11. The apparatus of claim 9, wherein said transport means comprises a shuttle style film gate.

12. The apparatus of claim 9, wherein said movement of said plate is substantially perpendicular to said scanning direction of said scanning beam.

13. The apparatus of claim 9, wherein: said scanning beam is derived from at least one of a cathode-ray tube, a fiber optic source, and a laser.

14. A plate for use in conjunction with a recording medium in an image recording apparatus, comprising:

an exposure slit; and means for mounting said plate with said exposure slit adjacent to a frame of said recording medium for passing radiation from an image to said frame via said slit; wherein:

said plate is adapted for translation from a first position to a second position to allow progressive exposure of said frame;

said plate is further adapted for translation from said second position to said first position in preparation for exposure of a subsequent frame of said recording medium; and said radiation comprises a scanning beam which scans across at least a portion of said slit to provide exposure of a corresponding region of said recording medium.

15. The plate of claim 14, wherein said translation of said plate from said first position to said second position is responsive to a control signal.

16. The plate of claim 14, wherein said mounting means are adapted to couple said plate to a transport member which transports said recording medium.

17. The plate of claim 14, wherein said exposure slit is elongated with an associated longitudinal axis;

said exposure slit being arranged such that said longitudinal axis is substantially parallel with a scanning direction of said scanning beam.

18. The plate of claim 14, wherein said translation of said plate from said second position to said first position is coordinated with movement of said scanning beam.

19. The plate of claim 14, wherein: said scanning beam is derived from at least one of a cathode-ray tube, a fiber optic source, and a laser.

* * * * *